United States Patent [19]
Krol

[11] Patent Number: 6,075,907
[45] Date of Patent: Jun. 13, 2000

[54] DUAL WAVELENGTH INTERROGATION SENSOR EMPLOYING LONG-PERIOD GRATINGS

[75] Inventor: Mark F. Krol, Painted Post, N.Y.

[73] Assignee: Corning Incorporated, Corning, N.Y.

[21] Appl. No.: 09/149,365

[22] Filed: Sep. 8, 1998

Related U.S. Application Data
[60] Provisional application No. 60/058,784, Sep. 12, 1997.

[51] Int. Cl.$^7$ ..................................................... G02B 6/00
[52] U.S. Cl. ................................ 385/12; 385/28; 385/37; 250/227.14
[58] Field of Search .................................. 385/12, 37, 28, 385/24, 31, 27; 250/227.14, 227.24

[56] References Cited

U.S. PATENT DOCUMENTS

| | | | |
|---|---|---|---|
| 5,513,913 | 5/1996 | Ball et al. | 374/120 |
| 5,641,956 | 6/1997 | Vengsarkar et al. | 250/227.14 |
| 5,889,901 | 3/1999 | Anderson et al. | 385/12 |
| 5,940,556 | 8/1999 | Moslehi et al. | 385/28 |

OTHER PUBLICATIONS

"Discrimination Between Strain and Temperature Effects Using Dual–Wavelength Fiber Grating Sensors," Elect. Lett. 30, p. 1085 (1994); M.G. Xu, J.–L. Archambault, L. Reekie, J.P. Dakin.

"Hybrid Fiber Bragg Grating/Long Period Fiber Grating Sensor for Strain Temperature Discrimination," IEEE Photo. Tech. Lett 8 (9) p. 1223 (1996) H. J. Patrick, G. M. Williams, A. D. Kersey, J. R. Pedrazzani and A. M. Vengsarkar.

"Simultaneous Strain and Temperature Measurement with Long–Period Gratings," Opt. Lett., vol. 22, No. 9, p. 648–650 (1997); V. Bhatia, D. Campbell, R. O. Claus.

*Primary Examiner*—Phan T. H. Palmer
*Attorney, Agent, or Firm*—Philip G. Alden

[57] ABSTRACT

A sensor system based on Long Period Gratings (LPGs) and a dual-wavelength interrogation scheme for sensing changes in a physical parameter such as temperature or strain. The system comprises a dual-wavelength laser light source, an optical waveguide for propagating the light, a long-period grating disposed in the path of the light, and a detector and processor for correlating a change in resonance wavelength with a numerical value for the physical parameter sensed. Additionally, multiple sensor elements are easily multiplexed by either time-division techniques or optical time domain reflectometry.

8 Claims, 4 Drawing Sheets

DUAL WAVELENGTH INTERROGATION SENSOR EMPLOYING LONG-PERIOD GRATINGS

This application claims the benefit of U.S. Provisional No. 60/058,784 filed Sep. 12, 1997.

FIELD OF THE INVENTION

The present invention relates to sensors. More particularly, the present invention relates to optical waveguide sensors which employ long-period gratings.

BACKGROUND OF THE INVENTION

In the last decade fiber optic sensors have gained considerable acceptance as alternatives to conventional sensing technologies. Fiber optic sensors provide several advantages over conventional sensors, including higher sensitivity, freedom from electromagnetic interference, and multiplexing capabilities. More recently, Fiber Bragg Gratings (FBGs) have emerged as an extremely versatile sensing technology. The Bragg resonance wavelength is sensitive to external perturbations through the therm-optic and stress-optic effects. As a result, FBGs can be used to sense a variety of environmental parameters such as temperature, strain, and pressure. In most applications either strain or temperature, but not both, is the parameter of interest.

One drawback of FBGs as sensor elements is that temperature and strain are often indistinguishable, because the change in the Bragg resonance wavelength is the result of a linear combination of strain and temperature effects. To overcome this ambiguity, a technique has been developed by Xu et al. which relies on the dispersion of the stress- and therm-optic coefficients. The technique utilizes two FBGs with different grating periods. Measurement of the temperature and strain dependence of the two Bragg wavelengths produces a system of two equations and two unknowns. These two equations can then be solved using matrix methods to determine the temperature and strain present in the surrounding medium. See M. G. Xu, J. L. Archambault, L. Reekie, and J. P. Dakin, "Discrimination Between Strain and Temperature Effects using Dual-Wavelength Fiber Grating Sensors," Elec. Lett. 30 (13) 1085 (1994).

One drawback of the technique used by Xu et al. is that the inverse of the 2×2 matrix must be well-conditioned. Thus, a large wavelength separation between the Bragg wavelengths of the FBGs comprising the sensor must be used. Additionally, the matrix elements must be known with a high degree of accuracy to minimize the error in temperature and strain recovery. Recently, Patrick et al. proposed a hybrid FBG/ Long Period Grating (LPG) sensor for strain/temperature discrimination. The sensor uses two FBGs in combination with a single LPG to simultaneously measure both temperature and strain. A detailed description of this sensor can be found by reading H. J. Patrick, G. M. Williams, A. D. Kersey, J. R. Pedrazzani, and A. M. Vengsarkar, "Hybrid Fiber Bragg Grating/ Long Period Fiber Grating Sensor for Strain/Temperature Discrimination," IEEE Phot. Tech. Lett. 8 (9)1223 (1996).

The sensors described by Xu et al. and Patrick et al. are examples of state-of-the-art fiber grating based temperature and strain sensors. However, these sensors have numerous deficiencies. First, both sensor designs require a complicated fabrication procedure. The dual-wavelength concept described by Xu et al. requires two FBGs to be fabricated per sensor while the hybrid sensor described by Patrick et al. requires three gratings per sensor ( 2 FBGs and 1 LPG ). In particular, the hybrid sensor requires all three gratings to be positioned accurately in wavelength. Second, both sensors make the design of multiplexed (or multi-point) sensor systems complicated. The dual-wavelength sensor requires the determination of two separated Bragg wavelengths (for example, 1.3 and 1.5 $\mu$m ) per sensor, and the hybrid sensor requires the determination of a single Bragg wavelength and two reflected amplitudes per sensor. Additionally, the latter occupies approximately 30–40 nm of spectral bandwidth making the multiplexing of a large number of sensors difficult at best. Finally, since the sensor described by Patrick et al. uses FBGs to probe the loss spectrum of the LPG, the shift of both the LPG and FBGs are encoded in the magnitudes of the reflected signals. As a result, processing of the received signals is difficult and still dependent on matrix techniques to finally derive the strain and temperature information. Furthermore, a review of the sensor literature demonstrates that the sensor element and multiplexing architecture are typically considered on a independent basis.

In view of the disadvantages in the art, it would be desirable to provide a sensor system for sensing at least one physical parameter employing a long-period grating, which provides simplified processing of the signals received from the long-period grating and facilitates the multiplexing of a large number of sensors. It would also be desirable to provide a sensor system which has the ability to athermalize the LPGs in the system and a system concept which considers the multiplexing system and sensor elements in a unified manner.

SUMMARY OF INVENTION

Accordingly, the present invention generally provides an optical waveguide sensor system for sensing at least one physical parameter comprised of a laser light source for providing a light signal comprising wavelengths $\lambda_1$ and $\lambda_2$, an optical waveguide for receiving and propagating the light signal, and a long period grating disposed in the path of the light signal having a resonance wavelength dependent on the physical parameter. The sensor system further includes a detector positioned in an operable relationship to the long period grating for detecting the power of the $\lambda_1$ and the $\lambda_2$ transmitted through the long period grating, and a processor attached to the detector for correlating the change in optical power of the $\lambda_1$ and the $\lambda_2$ with a numerical value for the physical parameter sensed.

In one aspect of the invention, the resonance wavelength of the long-period grating is greater than the $\lambda_1$ and less than the $\lambda_2$. In another aspect of the present invention, the physical parameter may be temperature or strain.

In still another embodiment of the present invention, the system described above includes a plurality of long-period gratings disposed in the path of the light signal having a resonance wavelength dependent on the physical parameter, a detector positioned in an operable relationship to the plurality of long period gratings for detecting the power of the $\lambda_1$ and the $\lambda_2$ transmitted through the plurality of long period gratings, and a processor attached to the detector for correlating the change in optical power of the $\lambda_1$ and the $\lambda_2$ with a numerical value for the physical parameter sensed.

In still another embodiment, the plurality of long-period gratings are multiplexed by time division multiplexing. Alternatively, the plurality of sensors are multiplexed by an optical time domain reflectometer arrangement. In an embodiment capable of sensing both temperature and strain, a plurality of pairs of long-period gratings are multiplexed by time division multiplexing. In this embodiment, the plurality of pairs of long-period gratings are disposed in the path of the light signal wherein each of the long-period gratings from the pair is sensitive to a different physical parameter. The system further includes at least a second laser light source for providing a light signal comprising wavelengths $\lambda_3$ and $\lambda_4$, at least a second detector positioned in an operable relationship to the plurality of long period gratings for detecting the power of the $\lambda_3$ and the $\lambda_4$ transmitted through the plurality of pairs of long-period gratings, and a processor attached to the detector for correlating the change in optical power of the $\lambda_1$, $\lambda_2$, $\lambda_3$, and $\lambda_4$ with numerical values for the physical parameters sensed.

The optical waveguide system of the present invention has several advantages. First, long-period grating sensor elements that are sensitive to either strain or temperature, but not both, can be produced. Also, the probe signals are derived from a dual-wavelength source, and the sensor elements consist of a single long-period grating which are easily fabricated by phase and/or amplitude-mask techniques. Additionally, the present invention allows multiple sensor elements to be easily multiplexed by either time-division techniques or optical time domain reflectometry.

Additional features and advantages of the invention will be set forth in the description which follows. It is to be understood that both the foregoing general description and the following detailed description are exemplary and explanatory and are intended to provide further explanation of the invention as claimed.

The accompanying drawings are included to provide a further understanding of the invention and illustrate one embodiment of the invention and together with the description serve to explain the principles of the invention. In the drawings, like reference characters denote similar elements throughout the several views. It is to be understood that various elements of the drawings are not intended to be drawn to scale, but instead are sometimes purposely distorted for the purposes of illustrating the invention.

DETAILED DESCRIPTION

Reference will now be made in detail to the present preferred embodiment of the invention, an example of which is illustrated in the accompanying drawings.

Figure 1:
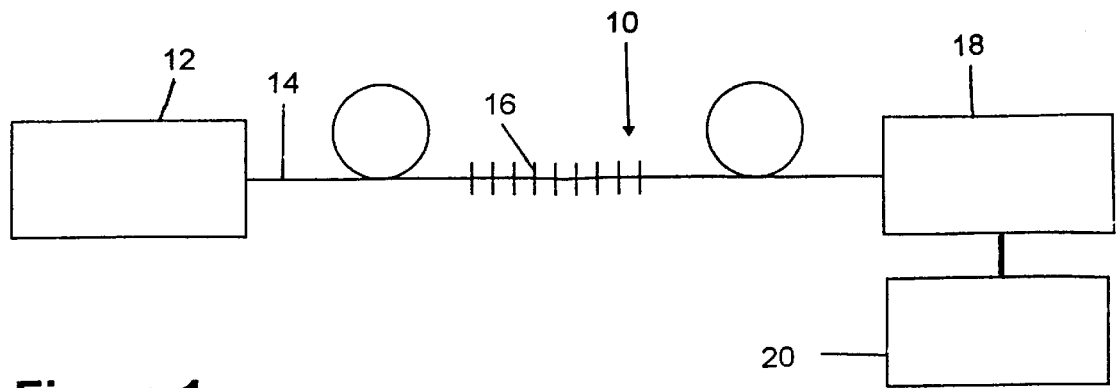
FIG. 1 is a schematic view of a long-period grating/dual-wavelength interrogation sensor system in accordance with the present invention.

An exemplary embodiment of the sensor system of the present invention is shown in FIG. 1 and is designated generally by reference numeral 10.

As embodied herein and referring to FIG. 1, the sensor system 10 for sensing at least one physical parameter such as temperature, strain, or pressure includes a laser light source 12 for providing a light signal comprising wavelengths $\lambda_1$ and $\lambda_2$ (a dual-wavelength source). The dual-wavelength source 12 may consist of, for example, two laser diodes or a single gain medium source. The sensor system of the present invention further comprises an optical waveguide 14 for receiving and propagating the light signal and a long-period grating 16 disposed in the path of the light signal. The long-period grating 16 has a resonance wavelength dependent on the physical parameter to be sensed. The sensor system further includes a detection system which may comprise a detector 18 positioned in an operable relationship to the long-period grating 16 for detecting the power of the $\lambda_1$ and $\lambda_2$ transmitted through the long-period grating 16. As shown in FIG. 1, the detector 18 is positioned at the end opposite the laser light source 12, with the long-period grating 16 positioned between the light source and the detector. The detection system may also include a processor 20 attached to the detector for correlating the change in optical power of the $\lambda_1$ and $\lambda_2$ with a numerical value for the physical parameter sensed.

In another aspect of the invention, the dual-wavelength detector system 18 may be comprised of two identical detectors. A highly reflecting fiber Bragg grating and optical circulator may be used to construct a low loss, low cross-talk demultiplexer such that each detector detects only one of the laser signals.

Figure 2:
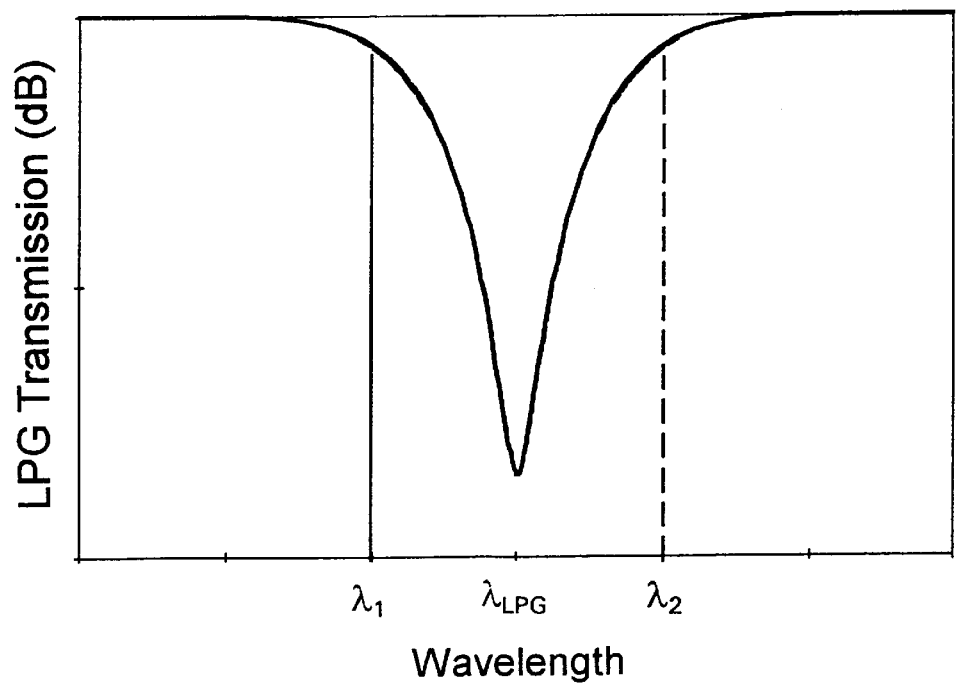
FIG. 2 is a graph showing a long-period grating transmission spectrum and interrogating laser wavelengths in the reference condition, in accordance with the present invention.
Figure 3:
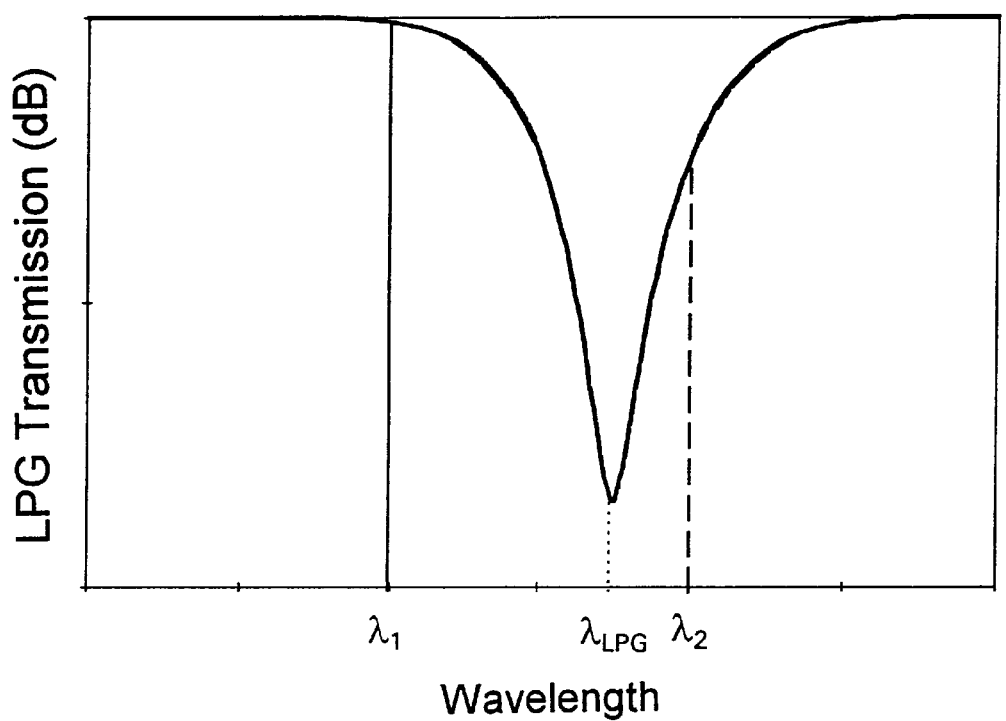
FIG. 3 is a graph showing long-period grating transmission spectrum and interrogating laser wavelengths when the sensor environment is perturbed, in accordance with the present invention.

FIGS. 2 and 3 illustrate the operating principle of a single sensor system of the present invention. As shown in FIG. 2, at a reference physical parameter, for example, strain, both laser signals $\lambda_1$ and $\lambda_2$ experience similar power loss upon propagation through the long-period grating ("LPG"). Thus, at a reference strain, $\Delta\epsilon=0$, the $\lambda_1$ and $\lambda_2$ are selected so that respective optical powers, $P_1$ and $P_2$, detected by the detector for each signal are approximately equal. As shown in FIG. 2, the resonance wavelength of the LPG, $\lambda_{LPG}$, is less than $\lambda_1$ and greater than $\lambda_2$.

FIG. 3 shows a graph of the LPG transmission spectrum and $\lambda_1$ and $\lambda_2$ when there is a change in the physical parameter, for example, a change in strain. Upon a change in strain, as shown in FIG. 3, the resonance wavelength of the LPG, $\lambda_{LPG}$, will shift to either a longer or shorter wavelength. As shown in FIG. 3, a shift of $\lambda_{LPG}$ to a longer wavelength will cause the optical power for each signal $P_1$ and $P_2$ received by the detector to change so that $P_1$ is greater than $P_2$.

As shown in FIG. 3 the change in strain is represented as an increase in the received optical power $P_1$ and a decrease in the received optical power $P_2$. Provided that the launched optical power at both wavelengths $\lambda_1$ and $\lambda_2$ is equal and the transmission vs. wavelength of the LPG is linear over the region that the LPG and laser wavelengths overlap, the strain (or other physical parameter such as temperature) can be expressed as $$f(P_1, P_2) = K\alpha \tag{1}$$

where K is a constant of proportionality, $\alpha$ is the measured parameter (either temperature or strain) and $$f(P_1, P_2) = \frac{P_1 - P_2}{P_1 + P_2} = \frac{T_1 - T_2}{T_1 + T_2} \qquad (2)$$

where $T_1$ and $T_2$ are the transmission coefficients of the LPG at the wavelengths $\lambda_1$ and $\lambda_2$, respectively.

The change in optical powers can be detected by the dual-wavelength detection system, and the processor can correlate the change in optical power of the signals $\lambda_1$ and $\lambda_2$ with a numerical value for the change in strain or other physical parameter.

There are several advantages to the sensor system of the present invention. The first is that long-period gratings can be athermalized, i.e., LPG sensor elements that are sensitive to either strain or temperature, but not both, may be produced. Another advantage is that the probe signals are derived from two different wavelength sources (or a dual wavelength, single gain medium source), and, as a result, the wavelengths of the probe signals do not change with environmental perturbations. In prior art sensor systems, such as the system described by Patrick et al. in, "Strain/ Temperature Discrimination Using Combined Fiber Bragg Grating and Long Period Grating Sensors," OFS-11 Proceedings, 96 (1996), the probe signals are derived from the FBG reflections which are very sensitive to environmental perturbations. In short, the present invention provides a much simpler interrogation scheme for detecting a change in physical parameter such as strain or temperature. An additional advantage is that the sensor element of the present invention consists of a single LPG and is easily fabricated by phase and/or amplitude-mask techniques.

Figure 4:
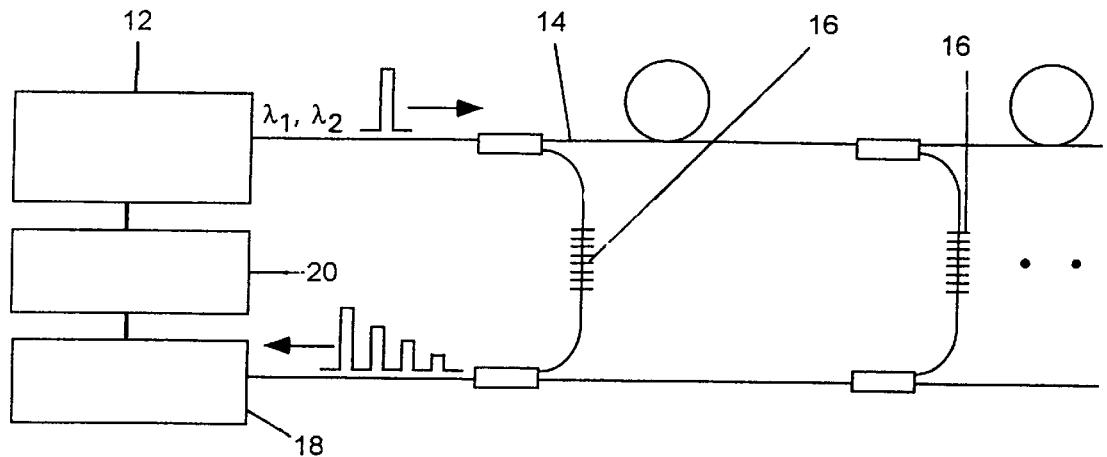
FIG. 4 is a schematic view of a dual-wavelength LPG/TDM multi-point sensor system, multiplexed using time division multiplexing, in accordance with the present invention.

Another embodiment of the invention will now be described where like or similar parts are identified throughout the drawings by the same reference characters. Referring now to FIG. 4, another advantage of the sensor system of the present invention is the ability to multiplex a large number of sensors. An exemplary embodiment show in FIG. 4 depicts two sensors multiplexed on a single fiber. The sensor system of the present invention is preferably multiplexed using either time division multiplexing (TDM) or optical time domain reflectometry (OTDR). For the sensor system of the present invention, in which multiple LPGs may be multiplexed, TDM is favored over WDM due to the fact that LPGs have a full width half maximum (FWHM) spectral width on the order of about 20–30 nm. The large spectral width makes WDM an unsuitable option when multiple LPG sensors must be multiplexed on a single fiber.

A suitable TDM architecture is shown in FIG. 4. The system comprises a laser light source 12 for providing a light signal comprising wavelengths $\lambda_1$ and $\lambda_2$, an optical waveguide fiber 14 for receiving and propagating the light signal, and a plurality of long-period gratings 16 disposed in the path of the light signal having a resonance wavelength dependent upon physical parameter sensed. The system further comprises a detector 18 positioned in an operable relationship to the plurality of long-period gratings for detecting the power of the $\lambda_1$ and $\lambda_2$ transmitted through the plurality of long-period gratings and a processor 20 attached to the detector for correlating the change in optical power of the $\lambda_1$ and $\lambda_2$ with a numerical value of the physical parameter sensed.

The system shown in FIG. 4 has the sensors in a rung arrangement wherein each "rung" is equipped with either a strain or temperature sensor. For applications requiring the simultaneous measurement of two different physical parameters, for example both temperature and strain at a single point, the TDM system can be combined with coarse WDM to accommodate two LPG elements (one for temperature and one for strain) per rung. The TDM/WDM system would then require two dual-wavelength sources, that is a first light source for providing a light signal comprising wavelengths $\lambda_1$, and $\lambda_2$ and at least a second laser light source for providing a light signal comprising wavelengths $\lambda_3$ and $\lambda_4$. The system would further comprise two dual-wavelength detection systems, that is a first detector for detecting the power of the $\lambda_1$ and $\lambda_2$ transmitted through the first long-period grating, and at least a second detector positioned in an operable relationship to the plurality of long period gratings for detecting the power of the $\lambda_3$ and the $\lambda_4$ transmitted through the plurality of pairs of long-period gratings, and a processor attached to the detector for correlating the change in optical power of the $\lambda_1$, $\lambda_2$, $\lambda_3$, and $\lambda_4$ with a numerical value for the physical parameters sensed (not shown). For example, the temperature components could be operated at about 1.3 $\mu$m and the strain components could be operated at about 1.5 $\mu$m.

Figure 5:
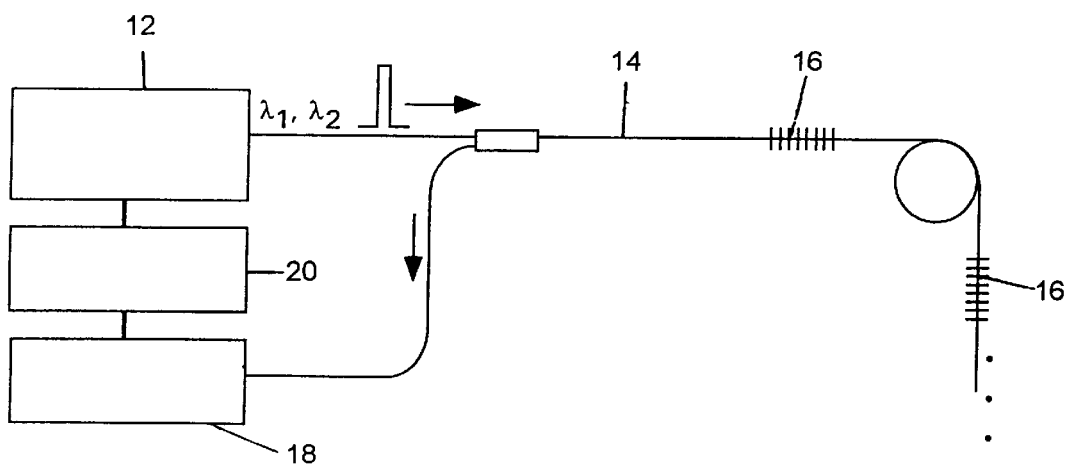
FIG. 5 is schematic diagram of a dual-wavelength long-period grating/optical time domain reflectometry sensor system, in accordance with the present invention.

Referring now to FIG. 5, an alternative to the TDM multiplexing system previously described is the use of Optical Time Domain Reflectometry (OTDR). An OTDR multiplexed system comprises a dual-wavelength source 12, an optical waveguide 14, a plurality of long-period gratings 16 disposed along the length of the waveguide 14, a dual wavelength detector 18 and a processor 20. The primary advantage of using OTDR is the requirement to have access to only one end of the sensing fiber. Additionally, OTDR techniques have been developed to measure loss in long lengths of optical fiber; hence, OTDR lends itself to interrogating multiplexed LPGs on a single fiber. The system is similar to a standard OTDR system except the single wavelength source and detector utilized in conventional OTDRs are replaced by a dual-wavelength source and a dual-wavelength detector as described previously.

An additional benefit of OTDR interrogation is the ability to multiplex both strain and temperature sensors on the same fiber using only a single dual-wavelength source. Of course adjacent sensors must be spaced by at least the minimum spatial resolution ($\Delta Z_{min}$) of the OTDR system, i.e.

$$\Delta z_{min} = \frac{c\tau}{2n} \qquad (3)$$

where $\tau$ is the optical pulse width, c is the speed of light in vacuum, and n is the effective index. As an example, assuming $\tau$=100 ns and n=1.5, the LPG sensors must be spaced by at least 10 m. If both temperature and strain information is required at the same spatial location along the sensing fiber, coarse-WDM can again be used. It is important to remember that adjacent pairs of sensors must still be separated by at least $\Delta Z_{min}$.

Figure 6:
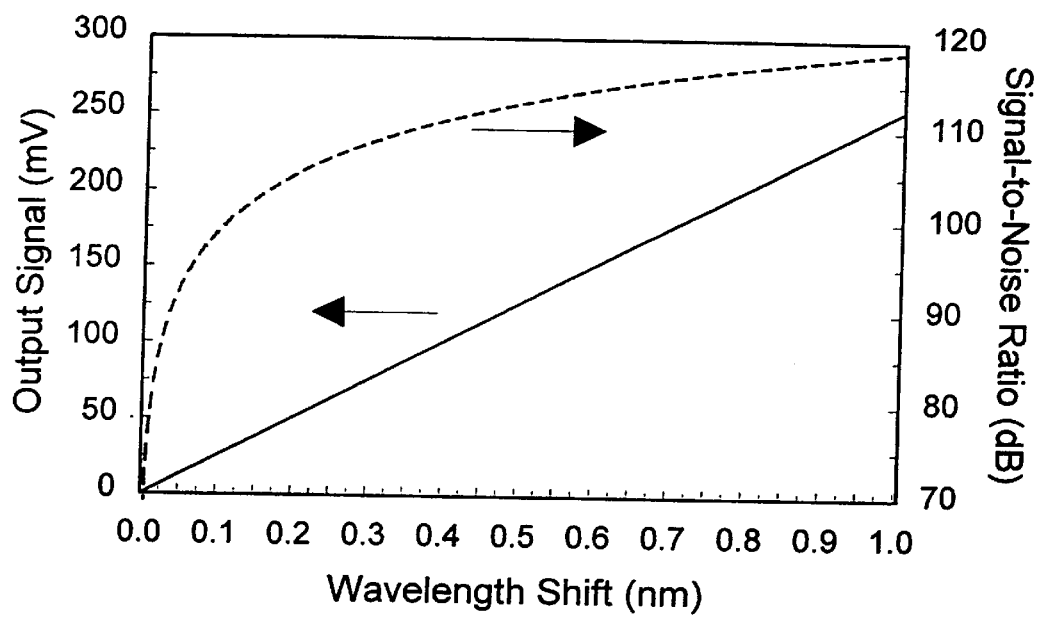
FIG. 6 is a graph showing output signal and signal-to-noise ratios versus the center wavelength shift of a long-period grating, in accordance with the present invention.

The performance of the sensor system in terms of sensitivity and signal to noise ratio (SNR) can be predicted using a mathematical system model based on laser powers that are assumed to be unequal and monochromatic, a LPG sensor characterized by a Gaussian loss spectrum, and a dual-wavelength detector system that is assumed to consist of two identical detectors. The sensitivity and linearity of the sensor can be optimized by proper selection of the LPG properties and interrogating laser wavelengths. FIG. 6 shows the output signal and SNR for a sensor system with a typical set of LPG and system parameters. The sensor system achieves a sensitivity of 250 mV/nm and a SNR exceeding 70 dB over a wavelength shift range of ±1 nm. Additionally, the sensor is highly linear with an error of 1% or less over the entire operating range.

Figure 7:
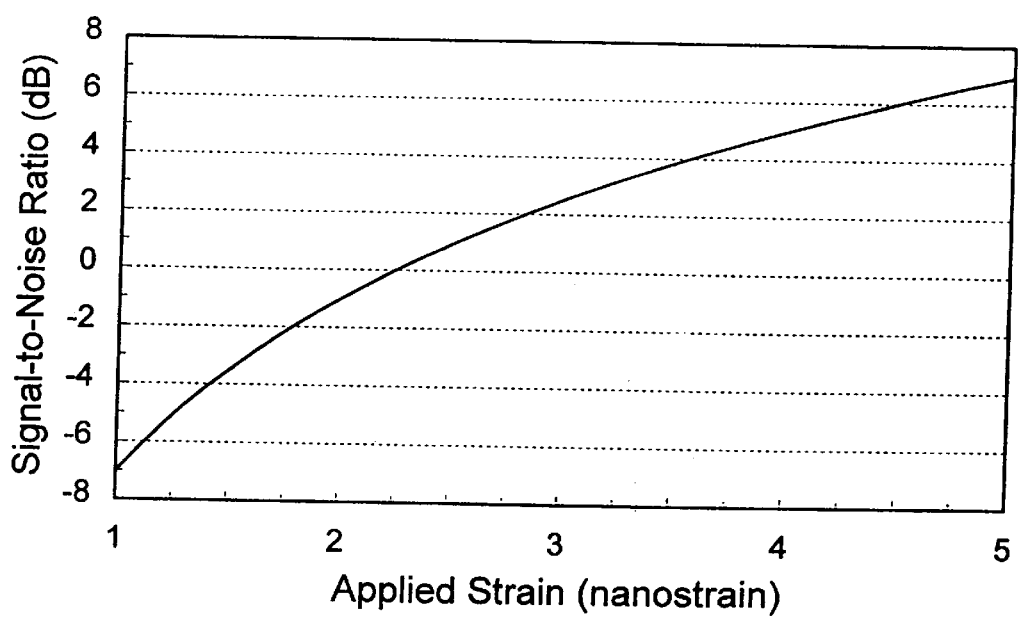
FIG. 7 is a graph showing signal-to-noise ratio versus applied strain, in accordance with the present invention.

To estimate the performance of the sensor system as either a strain or temperature sensor, LPG strain and temperature sensitivities were assumed to be 0.5 nm/mε and 0.05 nm/°C., respectively. Based on these assumptions, the resulting sensor system sensitivities are 12.5 mV/°C. and 125 mV/mε. A measure of the SNR performance of the system is given by the noise-equivalent-temperature (NET) and noise-equivalent-strain (NES), i.e. the temperature or strain induced wavelength shift required to produce a SNR=1 (or 0 dB). A plot of the SNR as a function of applied strain in the range required to produce a SNR=1 is shown in FIG. 7.

The corresponding NES was equal to 2.2 nε (nanostrain). A similar procedure indicates a NET equal to $55 \times 10^{-9}$ °C. The extremely low NES and NET illustrate the low noise and high sensitivity of the sensor system.

Thus, the system of the present invention has been shown to be highly sensitive to shifts of the LPG center wavelength while maintaining highly linear operation. For example, sensitivities as high as 250 mV/nm can be achieved while maintaining a deviation from linear operation of less than one percent. The noise performance of the sensor provides a SNR that exceeds 70 dB over a wide range of wavelength shifts. Additionally, by assuming typical LPG strain and temperature sensitivities, the NES and NET of the system were shown to be extremely low, i.e. 2.2 nε and $55 \times 10^{-9}$ °C., respectively. In conclusion, this analysis demonstrates the capability of the system to sense both temperature and strain with both high sensitivity and wide range combined with low noise operation.

It will be apparent to those skilled in the art that various modifications and variations can be made to the present invention without departing from the spirit or scope of the invention. For example, the optical waveguide sensors of the present invention may be any optical waveguide known to those skilled in the art such as an integrated optic sensor or a fiber optic sensor. The preferred sensor is a fiber optic sensor. The sensors can either be attached to a structure or embedded in a structure to detect a physical parameter such as temperature, strain, or changes in shape or corrosion of the structure. Thus, it is intended that the present invention cover the modifications and variations of this invention provided they come within the scope of the appended claims and their equivalents.

What is claimed is:

1. An optical waveguide sensor system for sensing at least one physical parameter comprising:

a laser light source for providing a light signal composed of two wavelengths $\lambda_1$ and $\lambda_2$;

an optical waveguide for receiving and propagating the light signal;

a long period grating disposed in the path of the light signal having a resonance wavelength dependent on the physical parameter;

a detector positioned in an operable relationship to the long period grating for detecting the power each of the two wavelengths $\lambda_1$ and the $\lambda_2$ transmitted through the long period grating; and a processor attached to the detector for correlating the change in optical power each of the two wavelengths $\lambda_1$ and the $\lambda_2$ with a numerical value for the physical parameter sensed.

2. The sensor system of claim 1 wherein the resonance wavelength of the long-period grating is greater than the $\lambda_1$ and less than the $\lambda_2$.

3. The sensor system of claim 2 wherein the physical parameter is temperature.

4. The sensor system of claim 2 wherein the physical parameter is strain.

5. An optical waveguide sensor system for sensing at least one physical parameter comprising:

a laser light source for providing a light signal comprising wavelengths $\lambda_1$ and $\lambda_2$;

an optical waveguide for receiving and propagating the light signal;

a plurality of long-period gratings disposed in the path of the light signal having a resonance wavelength dependent on the physical parameter;

a detector positioned in an operable relationship to the plurality of long period gratings for detecting the power each of the two wavelengths $\lambda_1$ and the $\lambda_2$ transmitted through the plurality of long period gratings; and a processor attached to the detector for correlating the change in optical power each of the two wavelengths $\lambda_1$ and the $\lambda_2$ with a numerical value for the physical parameter sensed.

6. The sensor system of claim 5 wherein the plurality of long-period gratings are multiplexed by time division multiplexing.

7. The sensor system of claim 6 further comprising:

a plurality of pairs of long-period gratings disposed in the path of the light signal wherein each of the long-period gratings from the pair is sensitive to a different physical parameter;

at least a second laser light source for providing a light signal comprising wavelengths $\lambda_3$ and $\lambda_4$;

at least a second detector positioned in an operable relationship to the plurality of long period gratings for detecting the power of the $\lambda_3$ and the $\lambda_4$ transmitted through the plurality of pairs of long-period gratings; and a processor attached to the detector for correlating the change in optical power of the $\lambda_1$, $\lambda_2$, $\lambda_3$, and $\lambda_4$ with a numerical value for the physical parameter sensed, wherein the system is capable of simultaneously sensing two different physical parameters.

8. The sensor system of claim 5 wherein the plurality of sensor are multiplexed by an optical time domain reflectometer arrangement.

* * * * *